INVENTORS
Edward C. HALE
Peter Stephen KEREKES

AGENT

United States Patent Office 3,454,457
Patented July 8, 1969

3,454,457
FABRICATED CAUL PLATE
Edward C. Hale, Beaconsfield, Quebec, and Peter S. Kerekes, Montreal, Quebec, Canada, assignors to Domtar Limited, Montreal, Quebec, Canada, a company of Canada
Filed Jan. 19, 1966, Ser. No. 521,659
Claims priority, application Canada, Feb. 10, 1965, 923,023
Int. Cl. B32b 3/00, 27/42, 27/30
U.S. Cl. 161—164        4 Claims

ABSTRACT OF THE DISCLOSURE

The present invention relates to a caul plate for use in moulding of plastic articles under conditions of elevated temperature and pressure, said caul plate having a core formed from sheets of thermosetting resin impregnated material set with a relief pattern pressed into one face thereof and with said one face covered by a release sheet formed from polytetrafluoroethylene, polyvinylfluoride or polypropylene.

---

The present invention relates to caul plates for surfacing laminates. More particularly, the present invention concerns a fabricated caul plate that is relatively inexpensive and can be impressed with various designs or the like for subsequent transfer onto a laminate being produced.

Usually stainless steel caul plates are used in the manufacture of laminated products consisting of fibrous sheets (i.e., paper) impregnated with phenol, cresol, melamine or epoxy-type thermosetting resins or the like, as for example, phenol formaldehyde or melamine formaldehyde resins, to produce a relatively smooth surface on the finished laminate. When it is desired to provide surfaces in relief on the finished laminate, stainless steel plates having the desired pattern etched or embossed on the surface, are used. Such caul plates are relatively expensive, and thus restrict the number of relief patterns that laminators can produce, particularly since production of laminates with relief surfaces is dependent on the number of such cauls available. To overcome this defect, laminated cauls formed from resin-impregnated sheets and with at least one exterior ply of aluminum foil, were proposed. (See U.S. Patent 2,606,855.) As described in U.S. Patent 2,606,855 to Jenkins, a plurality of resin-impregnated sheets and a surface layer of aluminum foil are pressed against a relief pattern and the resin fused to produce a fabricated caul with an impressed relief pattern. A plurality of such fabricated cauls could be produced from a single master pattern and thus a plurality of relatively cheap cauls may be made from a single master caul.

While fabricated cauls formed with aluminum foil release surfaces provided a relatively inexpensive method, such cauls suffered from a plurality of surface defects such as wrinkles, bubbling at high temperature and delamination, etc. Many of these defects are probably due to the relative rate of expansion of the aluminum and the resin-impregnated backing sheets as the temperature is raised. Probably the high rate of expansion of the aluminum, relative to the body of the caul, tended to separate the aluminum foil from the caul. The bond strength of the laminate resins to the aluminum foil is also not too strong. Applicant's invention overcomes these defects by using a film that has a rate of expansion equal to or preferably less than that of the remainder of the caul. In fact, applicant proposes to actually shrink a film onto the surface of the caul. Also the films preferred by applicant have a higher tensile strength than aluminum foil and thus resist tearing. When the film is treated (corona discharge) on one side it will form a strong bond with the core and thereby further resist tearing.

Similarly, the prior art fabricated cauls could only be used several times and then the releasing characteristic of the aluminum was diminished and sticking occurred. Also, the rejects of losses due to tearing of the aluminum release surface were relatively high. The present invention, on the other hand, provides a caul plate that shows no sign of sticking severe enough to tear the film when removed, even after many re-uses and thus is very resistant to tearing.

Applicant has further found that, by using a synthetic resin film as a surface release sheet in fabricating a caul, the thickness of the release sheet may be greatly reduced. Applicant has been able to manufacture a satisfactory caul using film as thin as 0.0005" as compared with cauls fabricated using aluminum foil wherein the thickness of the foil must be at least about 0.004".

It is thus the main object of the present invention to provide a fabricated caul which is less expensive than the heretofore-known laminated cauls and which, simultaneously, overcomes many of the inherent disadvantages of such prior fabricated cauls.

The present invention is based on the discovery that a caul plate fabricated with a synthetic resin film as a release surface can be produced cheaper and will outlast previously-known fabricated caul plates. Suitable synthetic resin films that may be used include polyvinyl fluoride (Tedlar), polytetrafluoroethylene (Teflon) and polypropylene, all of which have been specially treated on one surface to adhere to the body of the fabricated caul.

Further features, objects and advantages of the present invention will be evident from the following detailed description taken in conjunction with the accompanying drawings in which—

Figure 1:
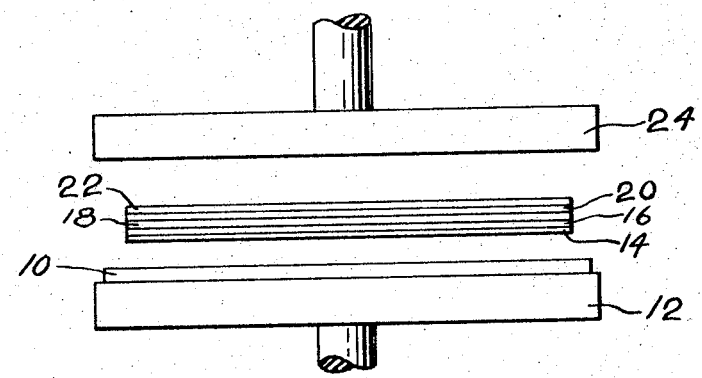
FIG. 1 is a schematic end view of a master caul and layup for producing a fabricated caul in accordance with the present invention.

To produce a caul plate in accordance with the present invention, a master caul 10 is placed on one platen 12 of a press. A sheet of synthetic resin film 14 overlies this master caul 10 and a plurality of resin-impregnated filler sheets 16, 18, 20, and 22 are laid on top of the film 14 to form the layup used to fabricate the caul. With the layup properly positioned, pressure is applied by the bottom and top platens 12 and 24 respectively of the press, and the temperature is increased to fuse the resin and bind the synthetic resin film and filler sheets together. The pattern on the master caul is impressed into the surface of the fabricated caul 26 by the pressure applied by the platens 12 and 24 and this pattern is substantially permanently retained on the caul 26 after the resin has set.

Filler sheets 14–22 inclusive are preferably sheets of paper impregnated with phenol formaldehyde resin. Other suitable resins, as for example, cresol formaldehyde, melamine formaldehyde or epoxy resins, or the like, may be used.

The surface sheet 14 of synthetic resin film is preferably biaxially-oriented polypropylene, a Tedlar, or Teflon film. Care must be taken in choosing the film since not all synthetic films will operate satisfactorily, for example, non-pigmented polyvinyl chloride cannot be used.

Regardless of which synthetic resin film is used as the release surface of the fabricated caul, the synthetic resin film chosen must be specially treated on one surface if it is to be bonded to the filler sheets when the thermosetting resin fuses. One suitable system of rendering a surface of a synthetic resin film bondable uses a corona discharge to oxidize the surface by high voltage applied to the surface and creating ozone immediately adjacent the sheet to thereby oxidize the surface. This treatment is generally known as the Lapel treatment and is usually used to make the surface of a synthetic resin film printable.

Figure 2:
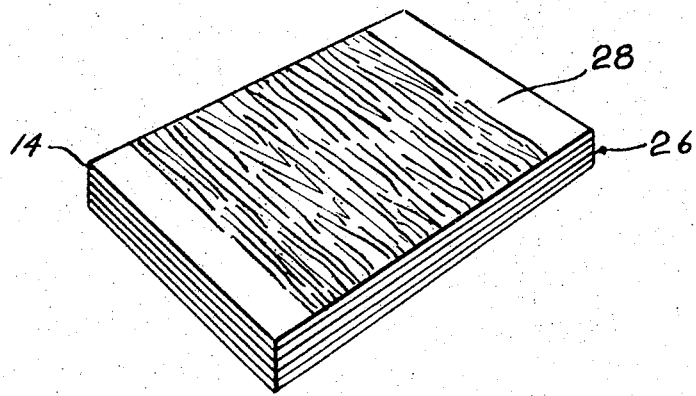
FIG. 2 is a perspective view of a formed caul.
Figure 3:
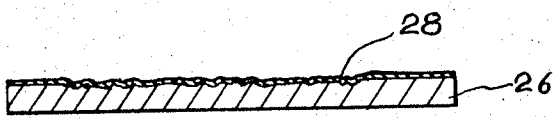
FIG. 3 is a section through a caul produced in accordance with the present invention and illustrating the relief surface.

A fabricated caul plate 26, according to the present invention, is shown in FIGS. 2 and 3. A caul 26 is integrated into a unitary body by fusion of the resin under heat and pressure applied in the press, and a suitable pattern 28 is incorporated onto the surface of the film by impression from the master caul 10. If an embossed pattern is not desired, the master caul used would have a smooth surface and thus provide a smooth surface on the caul 26. Where an impressed pattern is desired, as for example, wood grain or the like, the caul may be formed during pressing using wood as the master caul, and thus the fabricated caul produced would take the configuration of the particular wood used. Obviously both sides of the fabricated caul may have the same or different designs impressed therein so that both surfaces of the caul can be used simultaneously if desired.

As illustrated in FIG. 3, the caul 26, when impressed with a design, has the design embodied in relief directly into the surface of the caul.

The synthetic films used tend to shrink when they are heated and they are thus, in effect, stretched across the surface of the caul plate and are thereby held in intimate contact with the phenol-impregnated filler or backing sheets.

One specific example of the caul plate made in accordance with the present invention uses a 0.0005" thick sheet of Tedlar treated on one surface to render the film receptive to resin. Four sheets of 60 lbs. per 3000 sq. ft. kraft paper impregnated to a resin pickup of about 32% (± about 2%) with a water soluble phenol formaldehyde resin were piled one on the other onto the treated surface of the Tedlar sheet and finally a second sheet of treated Tedlar was placed onto the pile with its treated surface facing the uppermost resin impregnated sheet. The pack was then placed into a press together with a master caul of walnut wood veneer facing each Tedlar sheet and pressure was applied to impress the grain of the wood into the surface of the pack and to fuse the resin at elevated temperature to form a unitary fabricated caul having a surface in relief. The pressed laminate had a thickness of .025 inch and had a relief surface on opposite sides thereof matching that of the wood master cauls used.

A fabricated caul produced in accordance with this invention is used in the conventional manner in the production of decorative laminates. Such decorative laminates are usually made from a layup including a melamine formaldehyde impregnated cover sheet with or without a melamine formaldehyde impregnated overlay sheet together with a plurality of backing filler sheets impregnated with phenol formaldehyde resin. A plurality of such layups are placed into a press with the melamine impregnated sheets of each laminate facing the synthetic film surface of a fabricated caul of the present invention. With the layups and fabricated cauls so arranged in the press, pressure is applied to impress the surface of the layups with the embossed design on each caul and the resin in the laminate layups is fused under conditions of high temperature and pressure to form the laminates.

While applicant has disclosed a fabricated caul plate wherein the surface sheets of synthetic film are bonded to the resin impregnated moulded core, it is evident that a caul may be fabricated in which the surface sheets are not bonded to the core and thus are readily replaceable after use. To make a caul of this nature, the synthetic sheets would not be treated to make them receptive to resin, so that they may be stripped from the caul core having the permanent relief pattern and another film release sheet substituted. It is preferred to directly bond the film to the core of the fabricated caul, since better reproduction is probably achieved.

We claim:

1. A shaped fabricated caul plate for use in the pressure moulding of laminated plastic articles wherein said articles are placed with one surface facing a face of said caul plate and pressed at elevated temperature to impart a surface finish to said article corresponding to said face of said caul plate, said caul plate comprising a core of sheet material impregnated with thermosetting resin and having a relief pattern imparted to said face thereof and set therein under conditions of elevated temperature and pressure, a releasing surface layer formed from a film of a synthetic resin material selected from the group consisting of; polyvinylfluoride, polytetrafluoroethylene or polypropylene and said surface layer of synthetic sheet material covering said face and conforming to said relief pattern.

2. A caul plate as defined in claim 1 wherein said core is composed of a plurality of sheets of paper impregnated with phenol formaldehyde resin and which resin is set under conditions of heat and temperature in forming said caul plate.

3. A caul plate as defined in claim 2 wherein said film is bi-axially oriented polypropylene.

4. A caul plate as defined in claim 3 wherein said film is treated to permit same to bond and is bonded to said core.

References Cited

UNITED STATES PATENTS

| | | | |
|---|---|---|---|
| 2,205,466 | 6/1940 | Caprio et al. | 156—219 |
| 2,871,144 | 1/1959 | Doban | 117—138.8 |
| 3,018,189 | 1/1962 | Traver | 117—47 |
| 3,133,854 | 5/1964 | Simms | 161—219 X |
| 3,153,684 | 10/1964 | Bryan et al. | 264—80 |
| 3,171,539 | 3/1965 | Holbrook et al. | 206—46 |
| 3,215,579 | 11/1965 | Hagen | 156—289 |
| 3,228,823 | 1/1966 | Usala et al. | 161—219 X |
| 2,276,035 | 3/1942 | Guhl | 156—289 X |
| 2,697,893 | 12/1954 | Schaum | 161—164 X |
| 3,399,101 | 8/1968 | Magid | 156—209 X |

HAROLD ANSHER, *Primary Examiner.*

U.S. Cl. X.R.

161—189, 248, 413; 156—209, 219, 228, 289